US008166593B1

(12) United States Patent
Trauernicht et al.

(10) Patent No.: US 8,166,593 B1
(45) Date of Patent: May 1, 2012

(54) STABILIZING SYSTEM

(76) Inventors: Catharine W. Trauernicht, Potomac, MD (US); Mark T. MacLean-Blevins, Westminster, MD (US)

( * ) Notice: Subject to any disclaimer, the term of this patent is extended or adjusted under 35 U.S.C. 154(b) by 339 days.

(21) Appl. No.: 12/508,814

(22) Filed: Jul. 24, 2009

Related U.S. Application Data

(60) Provisional application No. 61/202,091, filed on Jan. 28, 2009.

(51) Int. Cl.
*E01D 1/00* (2006.01)
(52) U.S. Cl. ............ 14/71.1; 14/69.5; 119/847; 414/538
(58) Field of Classification Search .................. 14/69.5, 14/71.1; 119/847; 414/538, 921
See application file for complete search history.

(56) References Cited

U.S. PATENT DOCUMENTS

| | | | |
|---|---|---|---|
| 2,790,184 A | 4/1957 | Testa | |
| 3,820,912 A * | 6/1974 | Hughes | 404/35 |
| 4,628,561 A * | 12/1986 | Kushniryk | 14/69.5 |
| D291,619 S * | 8/1987 | Guillory | D34/32 |
| 5,133,634 A * | 7/1992 | Gingrich et al. | 414/537 |
| 5,213,060 A | 5/1993 | Sloan et al. | |
| 5,253,410 A * | 10/1993 | Mortenson | 29/436 |
| 5,340,266 A * | 8/1994 | Hodgetts | 414/527 |
| 5,768,733 A | 6/1998 | Kneebone | |
| 5,988,973 A * | 11/1999 | Plantinga et al. | 414/537 |
| 6,099,233 A * | 8/2000 | Craik | 414/537 |
| 6,185,775 B1 * | 2/2001 | McCarthy | 14/69.5 |
| 6,267,082 B1 | 7/2001 | Naragon et al. | |
| 6,868,574 B2 * | 3/2005 | Schomaker et al. | 14/69.5 |
| 6,941,889 B1 | 9/2005 | McCrocklin et al. | |
| 6,968,810 B2 | 11/2005 | Bishop | |
| 7,185,381 B1 | 3/2007 | Heartsill et al. | |
| 7,237,294 B2 | 7/2007 | Lensing | |
| 7,350,843 B2 | 4/2008 | Meyers et al. | |
| 2007/0289556 A1 | 12/2007 | Hoffman et al. | |

* cited by examiner

*Primary Examiner* — Gary S Hartmann
(74) *Attorney, Agent, or Firm* — Rosenberg, Klein & Lee

(57) ABSTRACT

The stabilizing system has a ramp having a first end mounted within a vehicle and a second end positioned on a base surface external to the vehicle. The stabilizing system further includes a tension mechanism having a first end section, a second end section, and a tension member positioned therebetween. The first end section of the tension mechanism is releasably coupled to the vehicle and the second end section of the tension mechanism is releasably coupled to the first end of said ramp. The ramp is maintained in fixed location with respect to said vehicle and said base surface.

19 Claims, 6 Drawing Sheets

STABILIZING SYSTEM

CROSS REFERENCE TO RELATED APPLICATIONS

This application claims priority to U.S. Provisional Patent Application Ser. No. 61/202,091, filed on 28 Jan. 2009.

FIELD OF THE INVENTION

The present invention relates to a stabilizing system. Specifically, the present invention concerns improvements on existing apparatuses used for the entry and exit of animals into and out of vehicles.

BACKGROUND OF THE INVENTION

The pet industry is concerned with accommodating for the safe transport of animals. Safe transport of pets always begins with the safe and proper entry of the pet into the transporting vehicle and always ends with the safe and proper exit of the animal from the transporting vehicle.

A problem facing many of the apparatuses used to assist pets into vehicles is that many are designed to be solely adapted for the rear hatch entry of a vehicle. An apparatus that employs entry and exit only through a rear hatch of a vehicle has intrinsic shortcomings that need to be addressed if the rear hatch is not an acceptable place for the pet to enter, exit, or stay during transportation. Accordingly, an apparatus that provides for safe entry and exit into a vehicle through a side door is needed. Currently, there are no ramps which can effectively provide safe access to a rear seat of a vehicle other than a van with sliding doors. This restriction typically results from the side doors being unable to open far enough to mount the ramp perpendicular to the vehicle. Placing a ramp into the side door of a vehicle despite these restrictions will cause the ramp to be oriented at an angle because only one portion of the ramp will make contact with the vehicle seat. This will leave the other portion of the ramp unsupported and further cause the ramp to be unstable and dangerous to the animal. A need exists to provide a stabilizing system that will fully support the ramp when the ramp is installed in the side door of a vehicle.

The present invention discloses a stabilizing system having a ramp and a tension mechanism. The ramp has a first end that is mounted within a vehicle, typically on a seat, and a second end that is positioned on a base surface, such as the ground, external to the vehicle. The tension mechanism includes a first end section, a second end section, and a tension member positioned between the first and second end sections. The first and second end sections are releasably coupled to the vehicle and the first end of the ramp respectively when the ramp is maintained in a fixed location with the vehicle and the base surface.

The releasable sliding engagement of the second end section of the tension member around an end of the ramp provides for easy and quick installation of the stabilizing system on either side of a vehicle. Specifically, the tension mechanism can be affixed to the ramp on either the driver's side or the passenger's side of the vehicle. Such permits a user to require the pet to enter and/or exit on a particular side of a vehicle such to avoid the animal being exposed to dangerous traffic.

Further still, the ramp is adapted to support a plurality of tension mechanisms. In configurations wherein multiple tension mechanisms are used, two or more tension mechanisms are installed on both sides of the ramp. This would permit stable and secure ramp use when animal access is necessary to boats or other elevated surfaces without a stable surface upon which the ramp can rest.

When the stabilizing system is fully implemented, the ramp is properly secured to a portion of a vehicle and stability is provided to the ramp. This stability is achieved by placing a portion of the first end of the ramp on a stable surface, such as a vehicle seat, while simultaneously holding the portion of the first end of the ramp not in contact with the vehicle seat with the stabilizing mechanism when the stabilizing mechanism is coupled to both the vehicle and the first end of the ramp.

PRIOR ART

The purpose of this system is to use the existing Ramp4Paws® ramp assembly, as disclosed and claimed in U.S. Pat. No. 6,928,959, with the side door of a vehicle. Currently, no pet ramp exists which can effectively and safely access the rear seat of a vehicle other than vans with sliding side doors. Typically, the side doors of vehicles overwhelmingly fail to open far enough for the perpendicular mounting of a ramp within a vehicle. Accordingly, any ramp placed into the side door of a vehicle will be mounted on the vehicle seat at an angle, and therefore, unstable because part of the ramp will not be in contact with the vehicle seat. Mounting a ramp in a vehicle at an angle would be unstable and dangerous to the animal entering and exiting the vehicle.

SUMMARY OF THE INVENTION

It is an object of the invention to provide a stabilizing system that can provide for the effective mounting of a ramp in the side door of a vehicle for safe animal access.

It is another object of the invention to provide a stabilizing system wherein a tension mechanism includes a coupling member formed from aluminum alloy and having a protective covering formed of a protective cloth wrapping, a molded rubber, or a plastic for releasable securement to the vehicle.

It is another object of the invention to provide a stabilizing system wherein the tension mechanism includes an adjustable strap to support the ramp.

It is another object of the invention to provide a stabilizing system wherein the tension member has an adjustable strap buckle member for selectively adjusting the length of the tension member.

It is another object of the invention to provide a stabilizing system wherein the ramp can be supported by a plurality of tension members.

It is another object of the invention to provide a stabilizing system wherein the tension mechanism forms a selectively adjustable loop for releasable sliding engagement around an end of the ramp.

It is another object of the invention to provide a stabilizing system wherein the loop includes a first strap and a second strap, coupled each to the other by a hook and loop fastening system, and a middle section positioned between each of the straps.

It is another object of the invention to provide a stabilizing system wherein the middle section of the second end section includes an internal stiffening member.

In order to provide these objectives, the stabilizing system has a ramp having a first end mounted within a vehicle and a second end positioned on a base surface external to the vehicle. The stabilizing system further includes a tension mechanism having a first end section, a second end section, and a tension member positioned therebetween. The first end section of the tension mechanism is releasably coupled to the vehicle and the second end section of the tension mechanism is releasably coupled to the first end of the ramp. The ramp is maintained in fixed location with respect to the vehicle and the base surface.

DESCRIPTION OF THE PREFERRED EMBODIMENT

Figure 1:
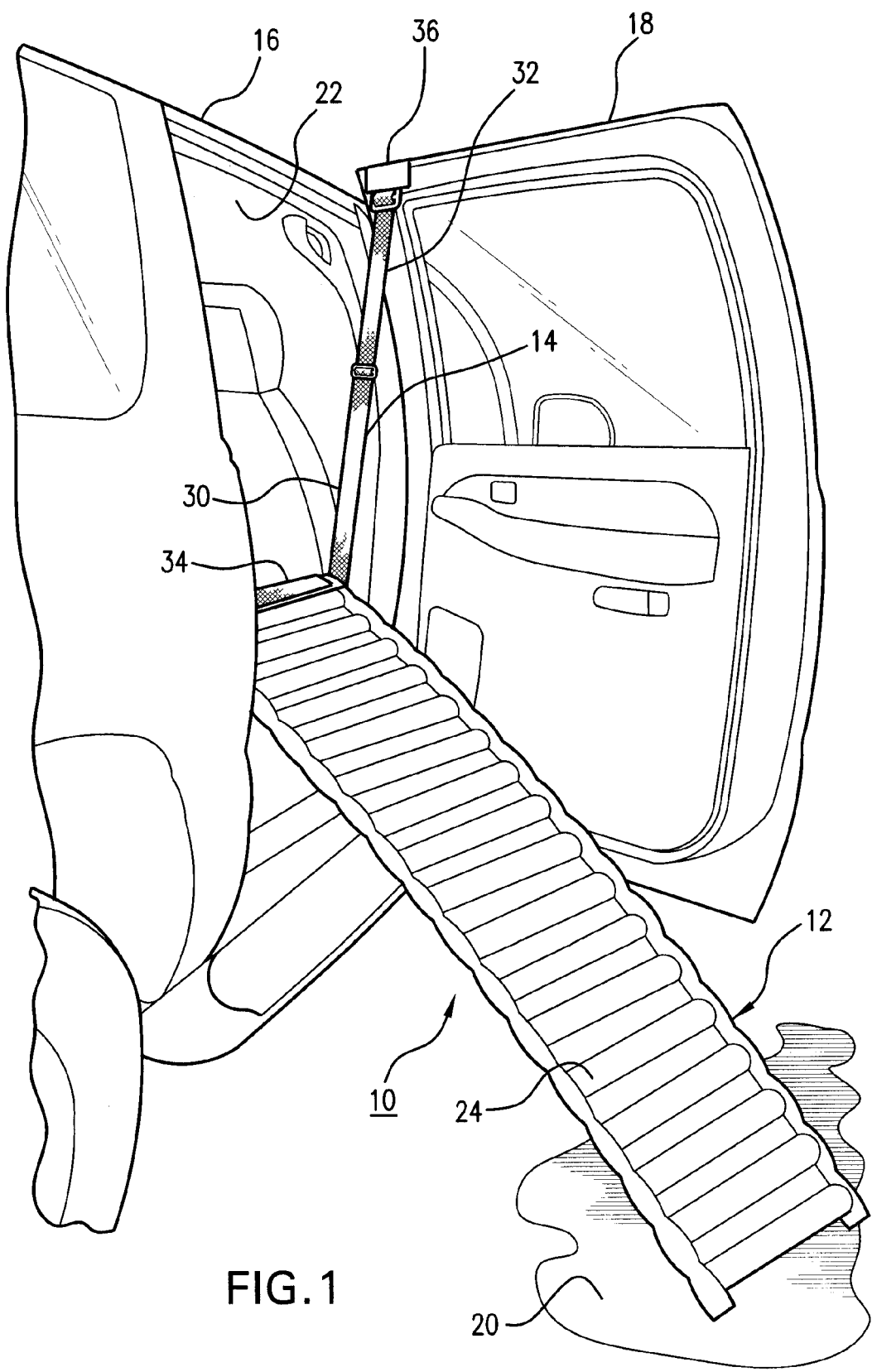
FIG. 1 is a perspective view of the stabilizing system.

Referring now to FIG. 1, there is shown stabilizing system 10 for stabilizing ramp 12 between a base surface 20 and at least a portion of the interior of vehicle 16. Ramp 12 is adapted to be releasably mounted to a base surface 20 and tension mechanism 14 to be described in following paragraphs.

Ramp 12 may be one of a variety of ramps which provide for a stable surface for the entry into a vehicle by a pet or mammal. Ramp 12 is provided to allow for an inclined surface leading from the base surface 20, which may be the ground, to the interior of the vehicle interior 22. Ramp 12 may have ramp undulations 24 which provide some frictional engagement with the pet's paws or the mammal's feet.

Figure 4:
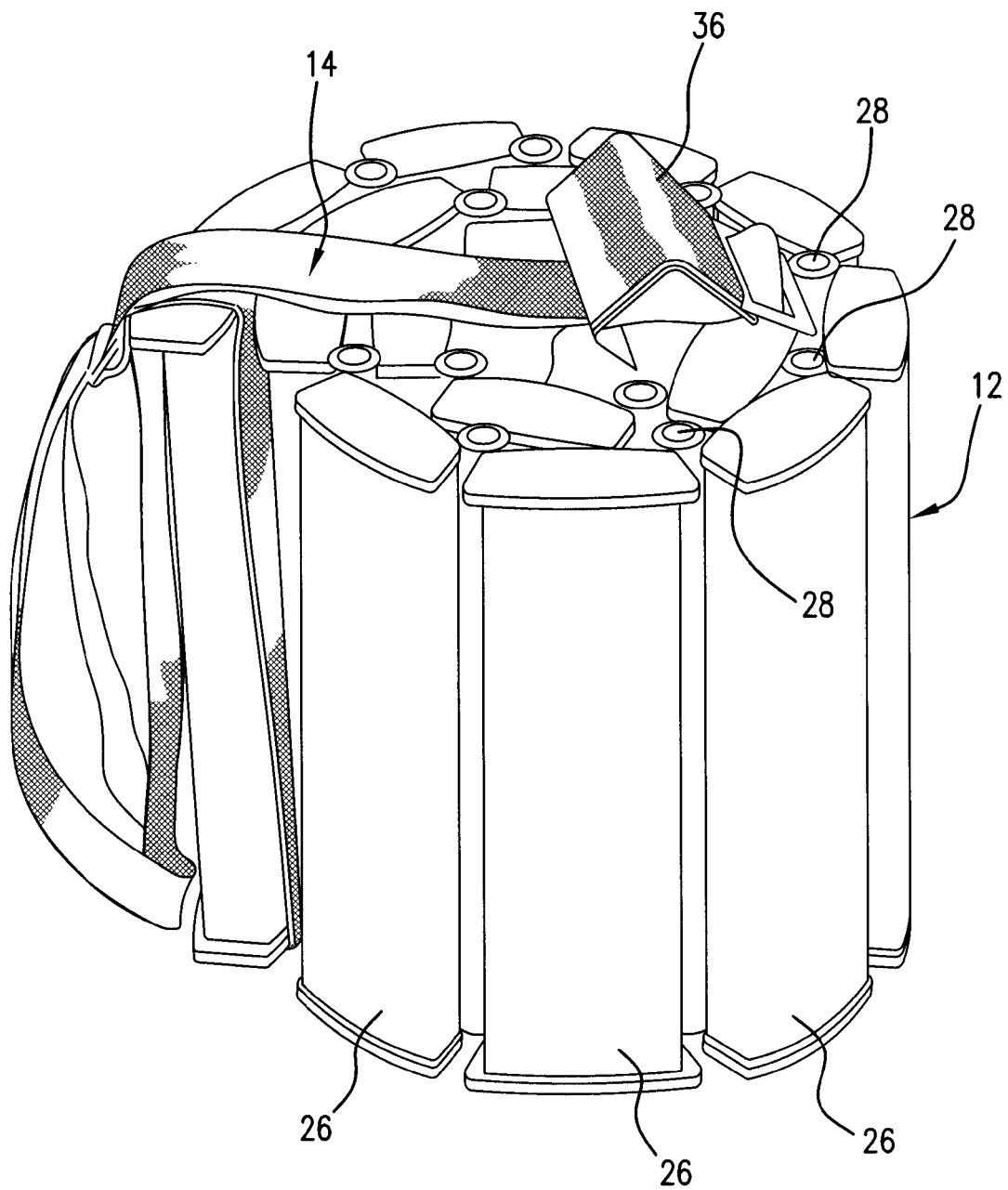
FIG. 4 is a perspective view of the stabilizing system in combination with the rolled-up pet ramp.

Ramp 12 may be of the type particularly described and shown in U.S. Pat. No. 6,928,959 which permits a foldable construction to allow ramp 12 to be maintained in a small and compact space as is shown in FIG. 4 and permits ease of entry into and exit from the vehicle. The important concept of the ramp 12 is to provide a stable and structurally rigid surface which can accept the load of the mammal or pet entering or exiting the vehicle 16. The particular construction and type of ramp 12 is not important to the inventive concept as herein described with the exception that ramp 12 be adapted to be mounted in a relatively stable manner to the base surface 20 and vehicle interior 22.

Ramp 12 may be formed in one piece construction or otherwise formed in accordance with the teachings of U.S. Pat. No. 6,928,959 where individual ramp sections 26 are joined each to the other by ramp bearings 28 which permits the overall ramp 12 to be rolled into a compact form and volume as shown in FIG. 4.

Figure 2:
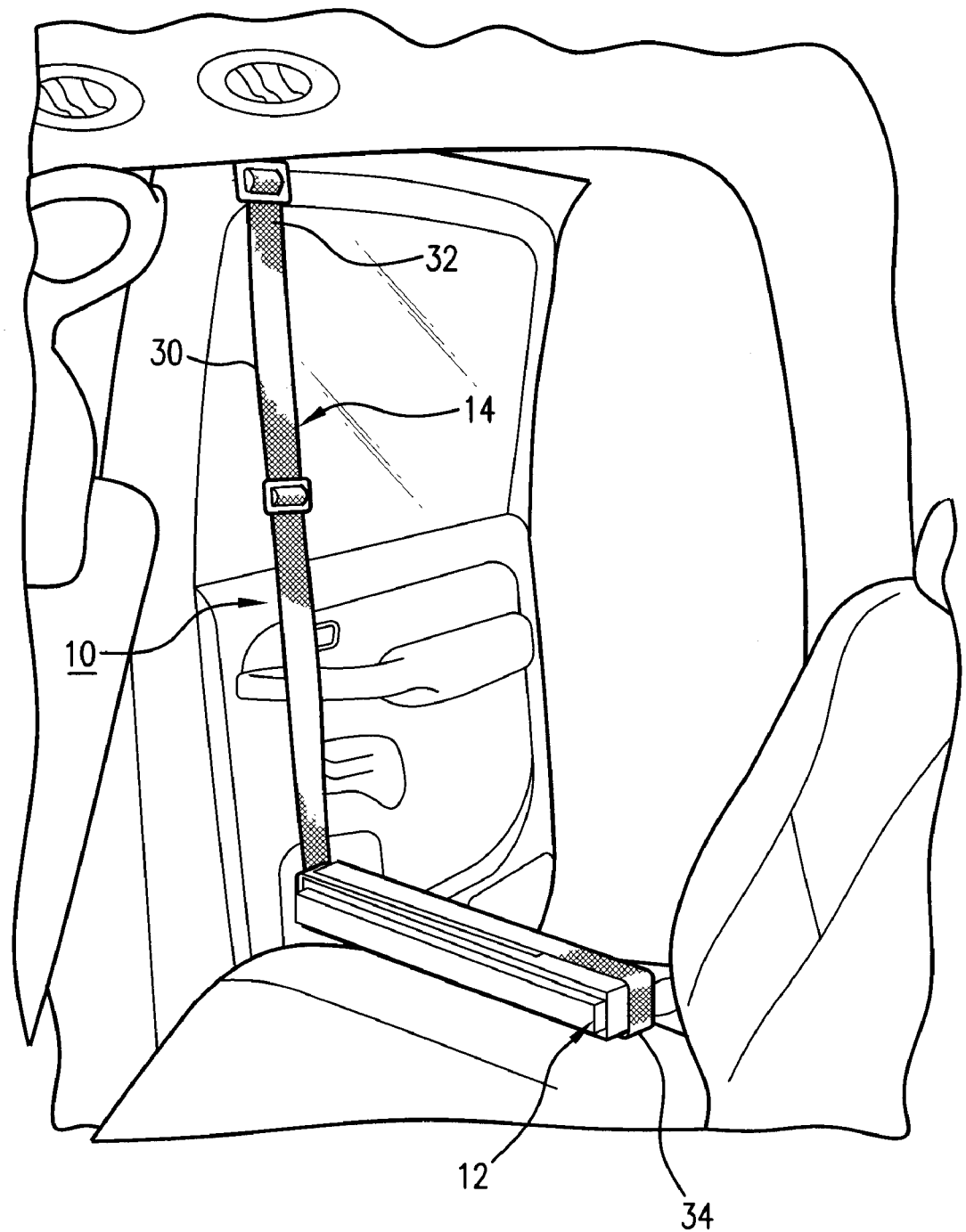
FIG. 2 is a perspective view of the stabilizing system from inside the vehicle.
Figure 3:
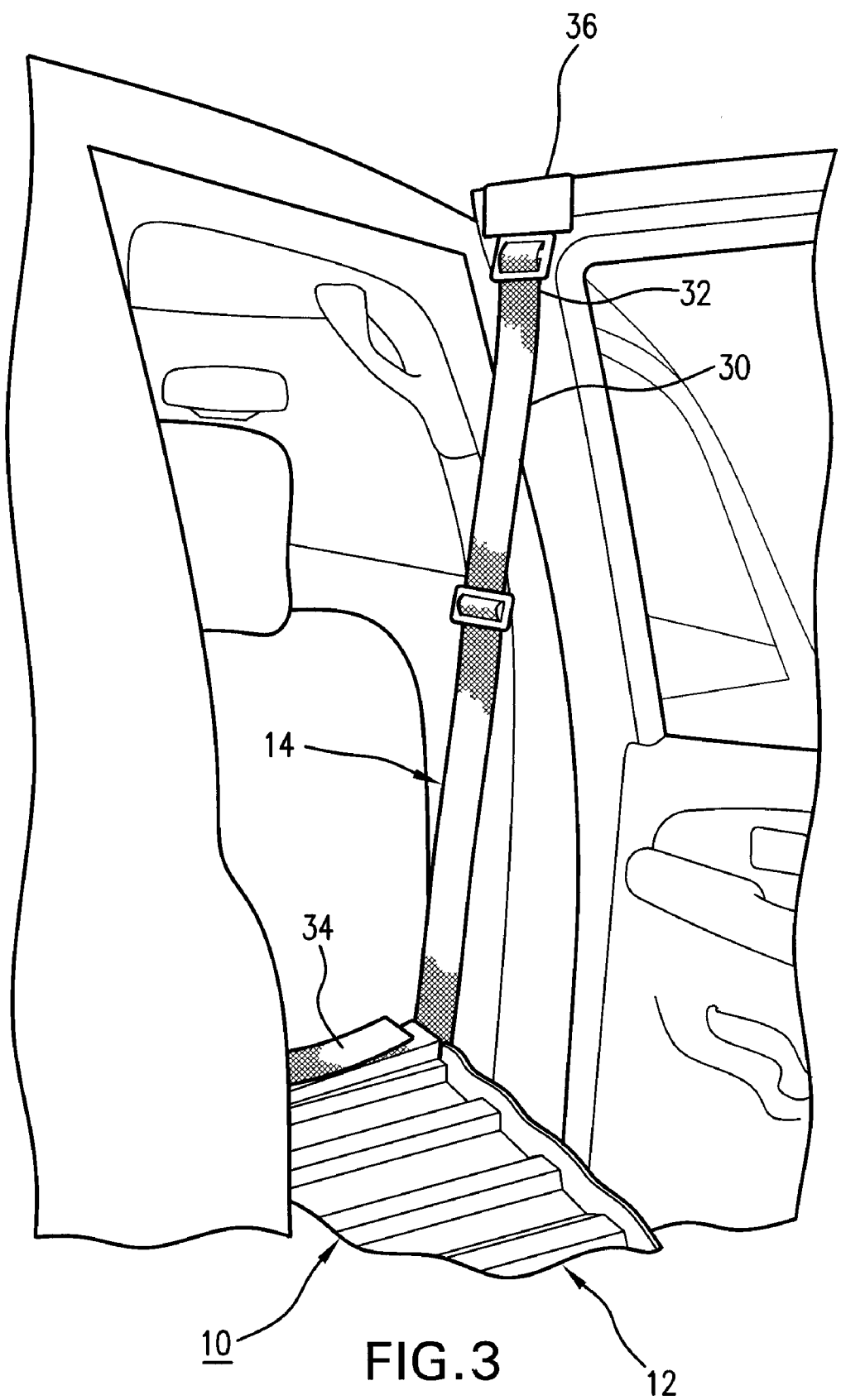
FIG. 3 is a close-up perspective view of the stabilizing system.

As can be seen in FIGS. 1, 2 and 3, stabilizing system 10 is particularly adapted to be mounted to vehicle door 18 of vehicle 16. As will be described in following paragraphs, stabilizing system 10, and in particular tension member 14, is mounted to an upper surface of vehicle door 18 in a releasable manner. Thus, ramp 12 is stabilized between vehicle 16 and base surface 20. When the stabilizing system 10 is to be removed from vehicle 16, the user simply unhooks the tension mechanism 14 from an upper surface of vehicle door 18, removes tension member second end section 34 from one end of ramp 12, and stores both tension mechanism 14 and ramp 12 in the rear of the vehicle 16 or in some other location not important to the inventive concept as herein described.

Figure 5:
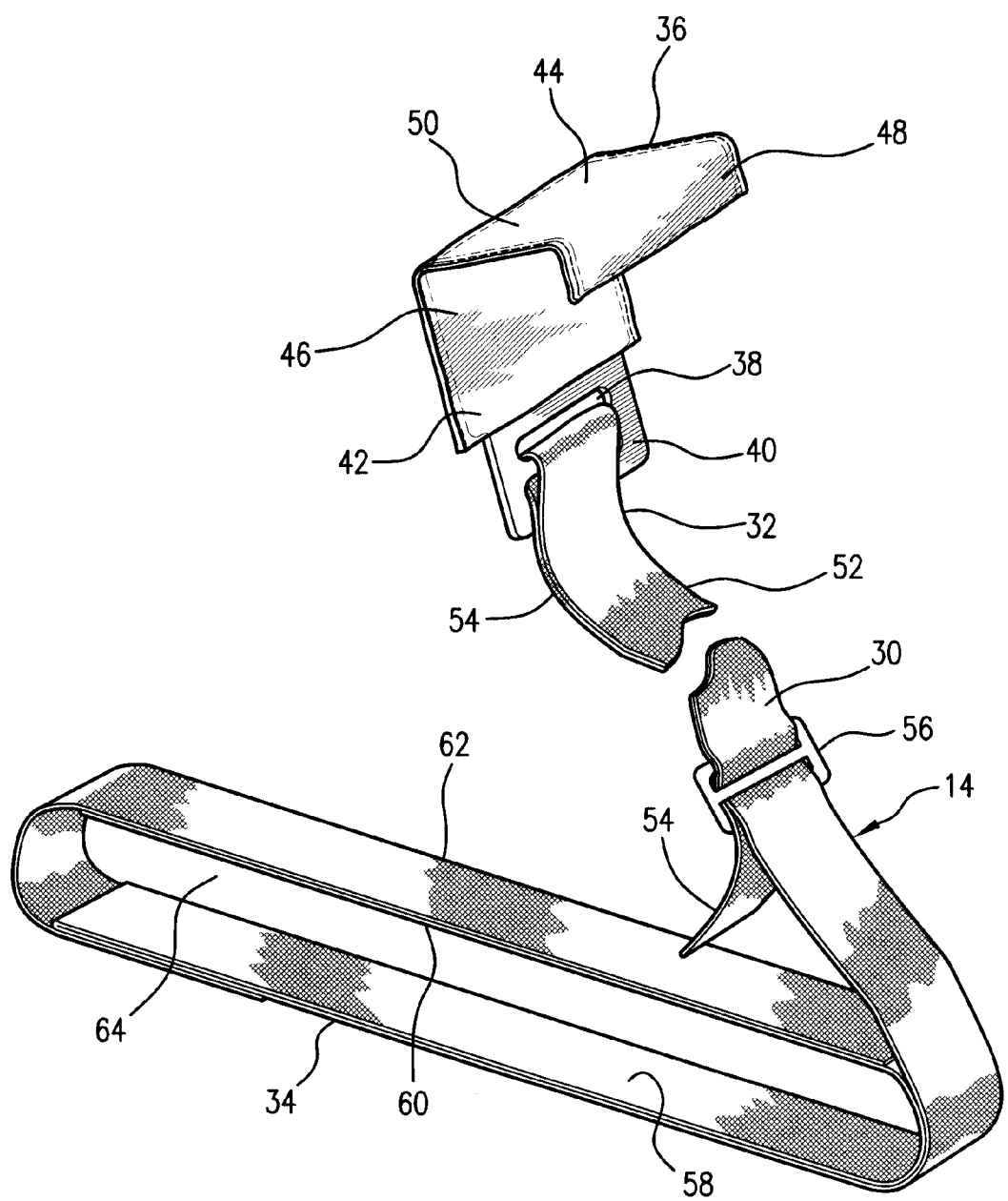
FIG. 5 is a perspective, partially cut-away view of the tension mechanism.
Figure 6:
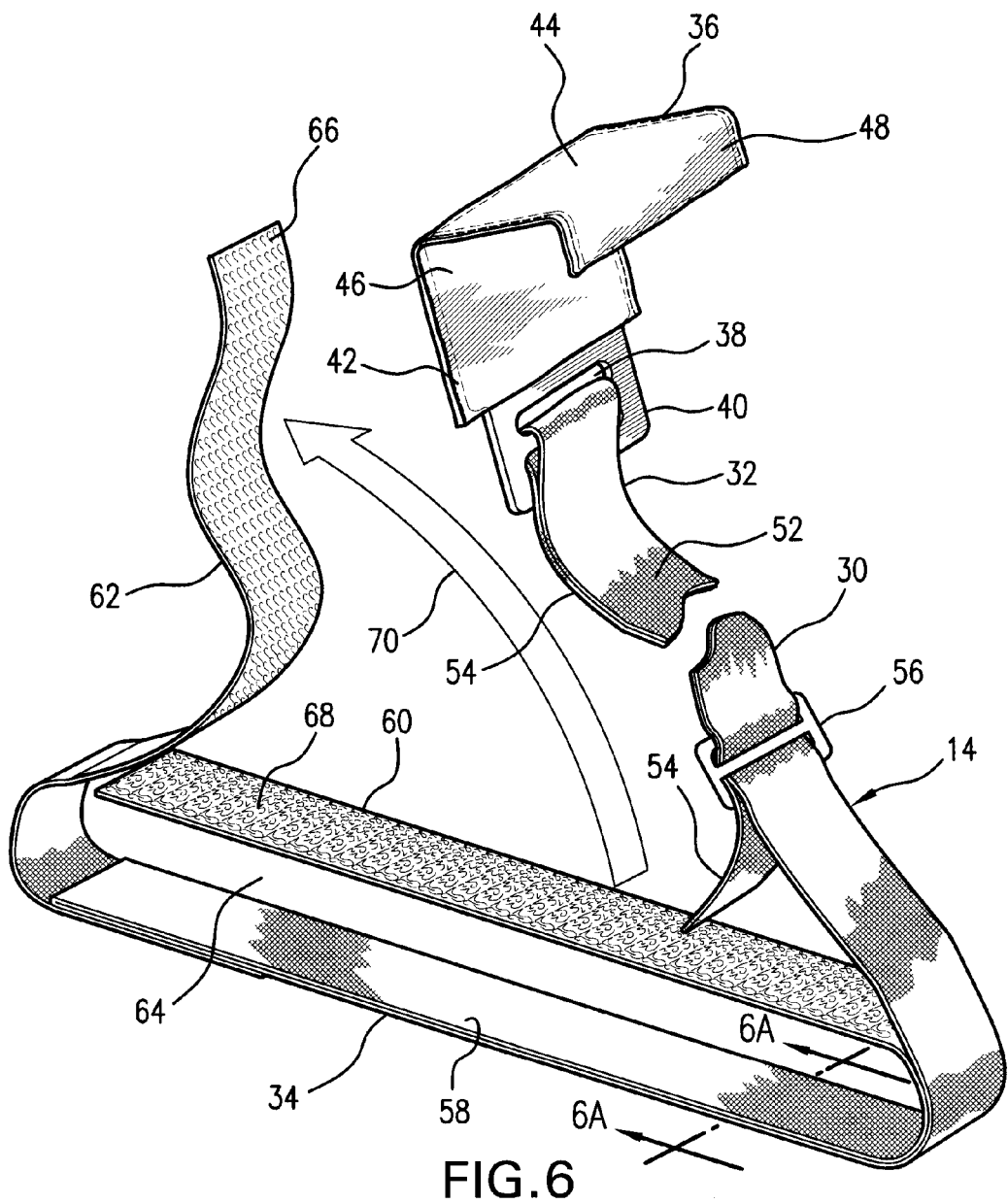
FIG. 6 is a perspective, partially cut-away view of the tension mechanism in an opened configuration.

Tension mechanism 14 includes first end section 32 and second end section 34 as is seen in FIGS. 5 and 6. In overall concept, tension member first end 32 of tension mechanism 14 is releasably coupled to vehicle 16. Tension member second end 34 of tension mechanism 14 is releasably coupled to a first end of ramp 12 whereby ramp 12 is thus maintained in a fixed location and in a stable manner with respect to vehicle 16 and base surface 20.

Referring now to tension mechanism 14, as is clearly shown in FIGS. 5 and 6, tension mechanism 14 includes a tension member first end section 32, a tension member 30, and a tension member second end 34 adapted to be releasably connected or coupled to a first end of ramp 12. In general, tension member 30 may be formed of a flexible composition and may be formed of a cloth-like strap construction, plastic, or other type of composition not important to the invention concept as herein described with the exception that tension member 30 is flexible and can maintain the loads applied thereto in the maintaining of ramp 12 in a relatively fixed and stable condition with respect to vehicle 16 and base surface 20.

As is seen in FIGS. 5 and 6, tension mechanism 14 and in particular tension member first end section 32 is coupled to strap coupling member 36 wherein strap coupling member 36 is releasably mounted to the upper surface of vehicle door 18 as shown in FIGS. 1-3. Tension member first end section 32 is seen in FIG. 5 to be mounted to strap coupling member 36 through an endless loop section passing through strap coupling member opening 38. Opening 38 is formed in strap coupling lug member 40 to permit passage of tension member first end 32 to pass therethrough. Tension member first end section 32 is formed of a flexible strap which as seen passes through opening 38 and is coupled to buckle 56 as shown.

Strap coupling lug member 40 is mounted in one-piece fashion to an upper section of strap coupling member 36 and constitutes an upper strap coupling member section 42. Both strap coupling lug member 40 and strap coupling member upper section 42 may be formed in one-piece formation and is particularly adapted to provide an inverted U-shaped contour as depicted in FIGS. 5 and 6. Upper section 42 of strap coupling member 36 is thus adapted to be mounted in a releasable manner to an upper surface of vehicle door 18 as is depicted in FIGS. 1-3. Strap coupling member upper section 42 includes generally a base section 44, a planar section 46, and a leg section 48. Leg section 48 is displaced from planar member section 46 of strap coupling member 36 by a predetermined distance which is adaptable to a standard automobile door 18 width. Thus, strap coupling member 36 may be releasably coupled or connected to the upper surface of door 18 and is easily removable therefrom.

In some instances, a strap coupling member cover 50 may be inserted over planar section 46, base section 44, and leg member 48 of coupling member 36. Strap coupling member cover 50 is generally a protective cloth wrapping, molded rubber, plastic, or any other substantially similar material which provides for a less abrasive contact of strap coupling member 36 with the upper surface of vehicle door 18. Strap coupling member 36, including strap coupling lug member 40 and upper section of strap coupling member 42, as well as base section 44, planar section 46, and leg section 48, is formed of a relatively rigid composition which may be aluminum, steel, or some other rigid metal or plastic material wherein such is adapted to accept the force loads imposed thereon.

Tension member 30 includes first strap section 52 and second strap section 54. As can be seen in FIGS. 5 and 6, tension member 30 is looped through strap coupling member opening 38. Thus, essentially, the first end section 32 of tension member 30 is forms a two ply strap section. The second strap section 54 of tension member 30 extends to and is releasably coupled to buckle member 56. Buckle 56 may be what is termed an adjustable strap buckle and is well known in the art. The important consideration is that first end section 32 of tension member 30 passes through buckle 56 and second strap section 54 is releasably coupled to buckle 56 on an underside thereof and in contact with first end section 32. In this manner, the overall length of tension member 30 may be adjusted to varying lengths dependent upon the type of vehicle 16 as well as the type of vehicle door 18 to allow stabilizing system 10 and particularly ramp 12 to be stabilized with respect to the ground or base surface 20 and the interior 22 of vehicle 16.

It is to be understood that the coupling of strap coupling member 36 to the upper surface of vehicle door 18 is exemplary in nature. In fact, strap coupling member 36 may adapted to be mounted to other portions of vehicle 16 and accessories thereof such as roof racks generally, bicycle racks, or other types of accessories. The important consideration is that the strap coupling member 36 has a releasable mounting to a portion of vehicle 16 to provide stabilization of ramp 12 when ramp 12 is maintained in a fixed position with respect to the interior of vehicle 16 and base surface 20.

Referring now to FIGS. 5-6, tension member second end section 34 is adapted to be mounted in a releasable manner around one end of ramp 12. Specifically, the tension member second end section 34 of the subject stabilizing system 10 can be readily adapted to be affixed to the ramp 12 such that the coupling member 36 can be releasably coupled to either the driver's side or passenger's side door depending on the side of the vehicle 16 the user wishes to install the system 10.

Referring once again to FIGS. 1-3 and 5-6, tension member second end section 34 is composed of first strap 62, second strap 60 and middle strap 58. As can be seen, middle strap member 58 is secured to first strap member 62 by sewing or some other like technique for joining middle strap 58 to first strap 62 in a fixed manner. Second strap 60 is formed in one-piece formation to middle strap 58.

In this manner, as is seen in FIG. 5, end section opening 64 is formed when first strap 62 is fixedly positioned with respect to second strap 60. End section opening 64 is adapted to permit the end of ramp 12 to be inserted therethrough and maintained in a relatively snug and contiguous mounting.

In order to provide for the adjustability of tension member second end section 34, first strap 62 and second strap 60 have a first hook-and-loop surface 66 and a second hook-and-loop surface 68 which are adapted to be mounted in contiguous contact with each other to permit an adjustability of opening 64, dependent upon the width and size of ramp 12. In this manner, as is seen in FIG. 5, first strap 62 and second strap 60 may be formed in a one-piece formation to provide a closed surrounding for the end of ramp 12. When it is desired to remove the stabilizing system 10 from the end of ramp 12 or adjust the peripheral length of the end section opening 64, as is seen in FIG. 6, first hook-and-loop surface 66 may be removed from second hook-and-loop surface 68 in the direction of directional arrow 70.

Figure 6A:
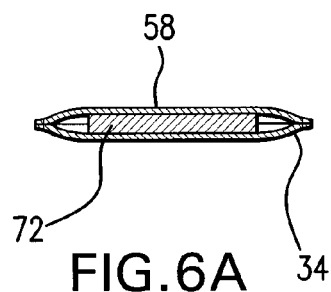
FIG. 6A is a cross-sectional view of the second end section of the tension mechanism.

Referring now to FIG. 6A there is shown a stiffening member 72 which is positioned between middle strap member 58 and the lower portion of second end section tension member 34. Stiffening member 72 gives rigidity to second end section 34 and is shown in cross section in FIG. 6A to provide a sandwiching effect for the related base of the straps. Stiffening member 72 may be formed of a metal composition such as aluminum; however, any material of substantially similar strength and availability can be used.

Although this invention has been described in connection with specific forms and embodiments thereof, it will be appreciated that various modifications other than those discussed above may be resorted to without departing from the spirit or scope of the invention. For example, functional equivalent elements may be substituted for those specifically shown and described, proportional quantities of the elements shown and described may be varied, and in the formation elements described, particular elements may be reversed or interposed, all without departing from the spirit or scope of the invention as defined in the appended claims.

What is claimed:

1. A stabilizing system comprising:
a ramp having a first end mounted within a vehicle and a second end positioned on a base surface external said vehicle; and
a tension mechanism having a first end section, a second end section, and a tension member therebetween;
wherein said first end section of said tension mechanism is releasably coupled to said vehicle, and said second end section of said tension mechanism is laterally looped about said first end of said ramp; and
wherein said ramp is maintained in fixed location with respect to said vehicle and said base surface.

2. The stabilizing system of claim 1, wherein said tension member is an adjustable strap.

3. The stabilizing system of claim 1, wherein said tension mechanism has a coupling member fixed to said first end section for releasable securement to said vehicle.

4. The stabilizing system of claim 3, wherein said coupling member is a U-shaped hook member.

5. The stabilizing system of claim 2, wherein said tension member has an adjustment mechanism for selectively adjusting a length of said tension member.

6. The stabilizing system of claim 5, wherein said adjustment mechanism includes an adjustable strap buckle member.

7. The stabilizing system of claim 1, wherein said ramp is supported by a plurality of said tension mechanisms, each of said tension mechanisms being releasably coupled on opposing sides of said first end of said ramp.

8. The stabilizing system of claim 1, wherein said second end section of said tension mechanism forms an opening for releasable sliding engagement around said first end of said ramp.

9. The stabilizing system of claim 8, wherein the peripheral length of said second end section looping about said first end of said ramp is selectively adjustable.

10. The stabilizing system of claim 1, wherein said second end section of said tension mechanism includes a first strap, a second strap, and a middle strap therebetween.

11. A stabilizing system comprising:
a ramp having a first end mounted within a vehicle and a second end positioned on a base surface external said vehicle; and
a tension mechanism having a first end section, a second end section, and a tension member therebetween;
wherein said second end section of said tension mechanism includes a first strap, a second strap, and a middle strap therebetween, said first strap and said second strap being coupled each to the other by a hook and loop fastening system to form an opening for releasable sliding engagement around said first end of said ramp;

wherein said first end section of said tension mechanism is releasably coupled to said vehicle and said second end section of said tension mechanism is releasably coupled to said first end of said ramp; and wherein said ramp is maintained in fixed location with respect to said vehicle and said base surface.

12. A stabilizing system comprising:

a ramp having a first end mounted within a vehicle and a second end positioned on a base surface external said vehicle; and a tension mechanism having a first end section, a second end section, and a tension member therebetween;

wherein said second end section of said tension mechanism includes a first strap, a second strap, and a middle strap therebetween, said middle strap of said second end section including an internal stiffening member;

wherein said first end section of said tension mechanism is releasably coupled to said vehicle and said second end section of said tension mechanism is releasably coupled to said first end of said ramp; and wherein said ramp is maintained in fixed location with respect to said vehicle and said base surface.

13. The stabilizing system of claim 3, wherein said coupling member is formed from an aluminum alloy.

14. The stabilizing system of claim 3, wherein said coupling member includes a protective covering.

15. The stabilizing system of claim 14, wherein said protective covering is formed of a protective cloth wrapping, a molded rubber, or a plastic.

16. A stabilizing system comprising:

a ramp having a first end mounted within a vehicle and a second end positioned on a base surface external said vehicle;

a tension mechanism having a first end section, a second end section, and an adjustable tension member therebetween;

a coupling member fixed to said first end section of said tension mechanism;

wherein said coupling member is releasably coupled to said vehicle and said second end section of said tension mechanism is laterally looped about said first end of said ramp; and wherein said ramp is maintained in fixed location with respect to said vehicle and said base surface.

17. The stabilizing system of claim 16, wherein said coupling member is a U-shaped hook member.

18. The stabilizing system of claim 16, wherein said adjustable tension member includes an adjustable strap buckle member.

19. The stabilizing system of claim 16, wherein said second end section of said tension mechanism forms an opening for releasable sliding engagement around said first end of said ramp.

* * * * *